(12) United States Patent
Mueller et al.

(10) Patent No.: US 10,539,412 B2
(45) Date of Patent: Jan. 21, 2020

(54) MEASURING AND CORRECTING OPTICAL MISALIGNMENT

(71) Applicant: Hewlett-Packard Development, Houston, TX (US)

(72) Inventors: Robert S Mueller, San Diego, CA (US); Jamie Etcheson, San Diego, CA (US); Christopher S Tanner, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 408 days.

(21) Appl. No.: 15/500,807

(22) PCT Filed: Jul. 31, 2014

(86) PCT No.: PCT/US2014/049295
§ 371 (c)(1),
(2) Date: Jan. 31, 2017

(87) PCT Pub. No.: WO2016/081411
PCT Pub. Date: Feb. 4, 2016

(65) Prior Publication Data
US 2017/0219339 A1    Aug. 3, 2017

(51) Int. Cl.
| | |
|---|---|
| *G01B 11/27* | (2006.01) |
| *G01B 11/03* | (2006.01) |
| *G01B 11/25* | (2006.01) |
| *G03B 17/54* | (2006.01) |
| *G03B 21/14* | (2006.01) |
| *G06F 3/03* | (2006.01) |
| *H04N 17/02* | (2006.01) |

(52) U.S. Cl.
CPC ............ *G01B 11/272* (2013.01); *G01B 11/03* (2013.01); *G01B 11/2504* (2013.01); *G03B 17/54* (2013.01); *G03B 21/142* (2013.01); *G06F 3/0321* (2013.01); *H04N 17/02* (2013.01)

(58) Field of Classification Search
None
See application file for complete search history.

(56) References Cited

U.S. PATENT DOCUMENTS

| | | |
|---|---|---|
| 6,385,334 B1 | 5/2002 | Saneyoshi et al. |
| 7,599,561 B2 | 10/2009 | Wilson et al. |
| 7,710,391 B2 | 5/2010 | Bell et al. |

(Continued)

FOREIGN PATENT DOCUMENTS

| | | |
|---|---|---|
| DE | 102009057996 A1 | 5/2011 |
| JP | 11-327042 A | 11/1999 |

(Continued)

OTHER PUBLICATIONS

Deutscher et al., "Automatic Camera Calibration from a Single Manhattan Image," Systems Research Center, Compaq Computer Corp, 2002, 1-14 /research.microsoft.com/.

(Continued)

*Primary Examiner* — Leon Viet Q Nguyen
(74) *Attorney, Agent, or Firm* — HP Inc. Patent Department

(57) ABSTRACT

A system includes a calibration plate with fiducial markers, a device under test interface, an alignment stage with a rotary sub-stage and a linear sub-stage, and a camera on the alignment stage.

18 Claims, 6 Drawing Sheets

(56) References Cited

U.S. PATENT DOCUMENTS

| | | | |
|---|---|---|---|
| 7,807,479 B1* | 10/2010 | Lindsey, Jr. | H01L 21/67092 257/E21.521 |
| 8,121,640 B2 | 2/2012 | Russ et al. | |
| 8,199,117 B2 | 6/2012 | Izadi et al. | |
| 8,662,676 B1 | 3/2014 | Chang et al. | |
| 8,736,583 B2 | 5/2014 | Anderson et al. | |
| 10,198,080 B1* | 2/2019 | Worley, III | G02B 27/0093 |
| 2003/0142973 A1* | 7/2003 | Sawada | F16M 11/10 396/427 |
| 2005/0078092 A1 | 4/2005 | Clapper | |
| 2007/0273795 A1 | 11/2007 | Jaynes et al. | |
| 2008/0018591 A1 | 1/2008 | Pittel et al. | |
| 2011/0055729 A1* | 3/2011 | Mason | G06F 3/0425 715/753 |
| 2011/0242054 A1 | 10/2011 | Tsu | |
| 2013/0077236 A1 | 3/2013 | Becze et al. | |
| 2013/0278783 A1 | 10/2013 | Larson | |
| 2014/0368614 A1* | 12/2014 | Imai | G01B 21/047 348/47 |
| 2016/0037144 A1* | 2/2016 | Schultz | G03B 21/28 348/745 |

FOREIGN PATENT DOCUMENTS

| | | |
|---|---|---|
| JP | 2006-064913 A | 3/2006 |
| JP | 2007-306613 A | 11/2007 |
| WO | WO-97/36147 A1 | 10/1997 |
| WO | WO-2014/042514 A2 | 3/2014 |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

* cited by examiner

MEASURING AND CORRECTING OPTICAL MISALIGNMENT

BACKGROUND

A user may interact with a computer's projected display. For example, the user may tap, drag and drop, and use other gestures to manipulate graphical user interface elements projected onto the display. If the image projected onto the display is misaligned, a touch of a position may be detected to the right, to the left, or not at all, which can make performing any task frustrating and ruin the user experience. Thus what are needed are method and apparatus to properly align a projected image onto a display.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on. The term "or" is used to refer to a nonexclusive such that "A or B" includes "A but not B," "B but not A," and "A and B" unless otherwise indicated.

In examples of the present disclosure, an optical alignment measurement system may use a camera to capture a measurement image projected by a device under test (DUT) on a calibration plate with fiduciary markers to determine if the DUT meets a specification. The accuracy of such an optical measurement is reduced when the camera is not properly aligned with thee calibration plate. The reduced accuracy may result in passing a DUT that is actually out of specification or failing a DUT that actually meets a specification. Thus what are needed are method and apparatus to measure and correct optical misalignment.

In examples of the present disclosure, an image may be a photograph, a digital picture, a frame of a video, or a view from the camera.

Figure 1:
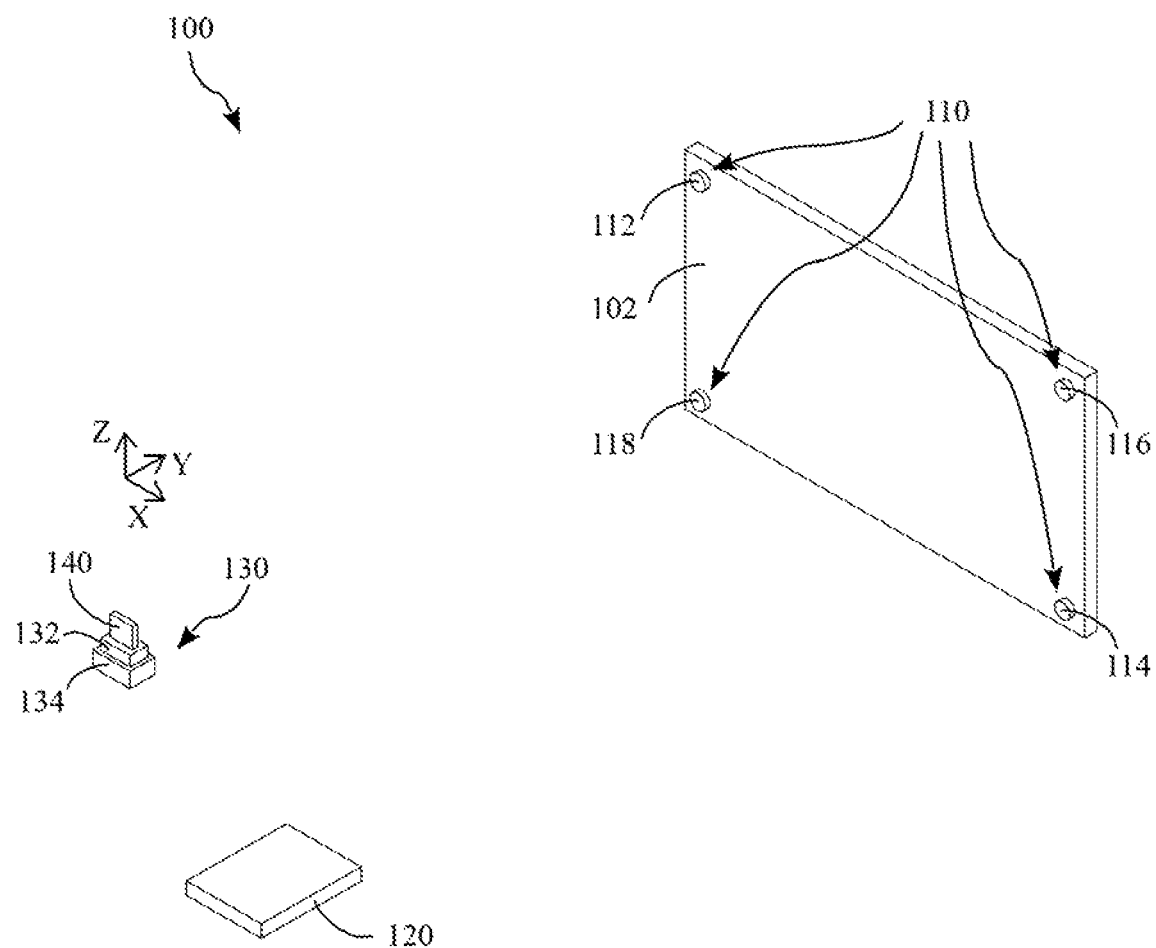
FIG. 1 is a schematic perspective view of an optical alignment measurement system in examples of the present disclosure.

FIG. 1 is a schematic perspective view of an optical alignment measurement system 100 in examples of the present disclosure. The optical alignment measurement system 100 may include a calibration plate 102 with fiducial markers 110, a DUT interface 120, an alignment stage 130, and a camera 140 on the alignment stage 130. Alignment stage 130 may include a rotary sub-stage 132 and a linear sub-stage 134.

Calibration plate 102 is parallel to the XZ plane. Fiducial markers 110 may include a first fiducial marker 112, a second fiducial marker 114, a third fiducial marker 116, and a fourth fiducial marker 118. DUT interface 120 may be a mount with mechanical features to receive a DUT. Camera 140 may be mounted on rotary sub-stage 132 and rotary sub-stage 132 may be mounted on linear sub-stage 134, or camera 140 may be mounted on linear sub-stage 134 and linear sub-stage 134 may be mounted on rotary sub-stage 132. Rotary sub-stage 132 may be rotatable about a vertical Z direction and the linear sub-stage 134 may be translatable along a horizontal X direction.

Figure 2:
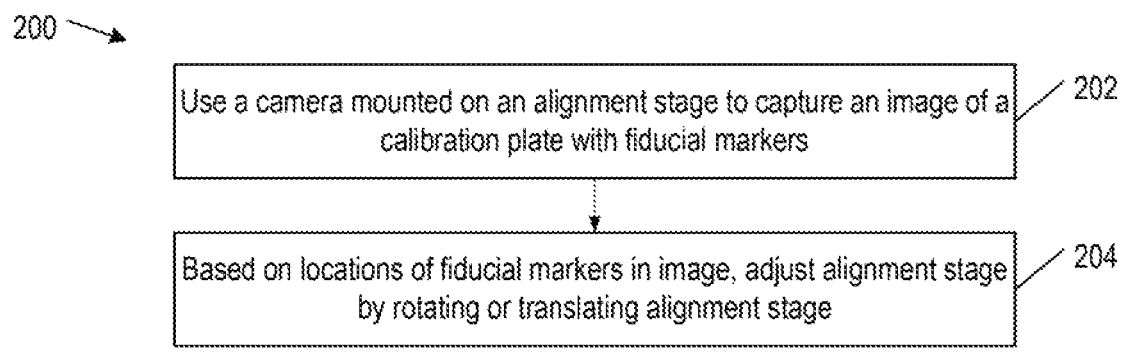
FIG. 2 is a flowchart of a method for the optical alignment measurement system of FIG. 1 to measure and correct optical misalignment in examples of the present disclosure.

FIG. 2 is a flowchart of a method 200 for optical alignment measurement system 100 of FIG. 1 to measure and correct optical misalignment in examples of the present disclosure. Method 200 may begin in block 202.

In block 202, camera 140 of FIG. 1 is used to capture an image of calibration plate 102 of FIG. 1 with fiducial markers 110 of FIG. 1. Block 202 may be followed by block 204.

In block 204, alignment stage 130 of FIG. 1 is adjusted by rotating or translating alignment stage 130 based on the locations of fiducial markers 110 in the image.

Figure 3:
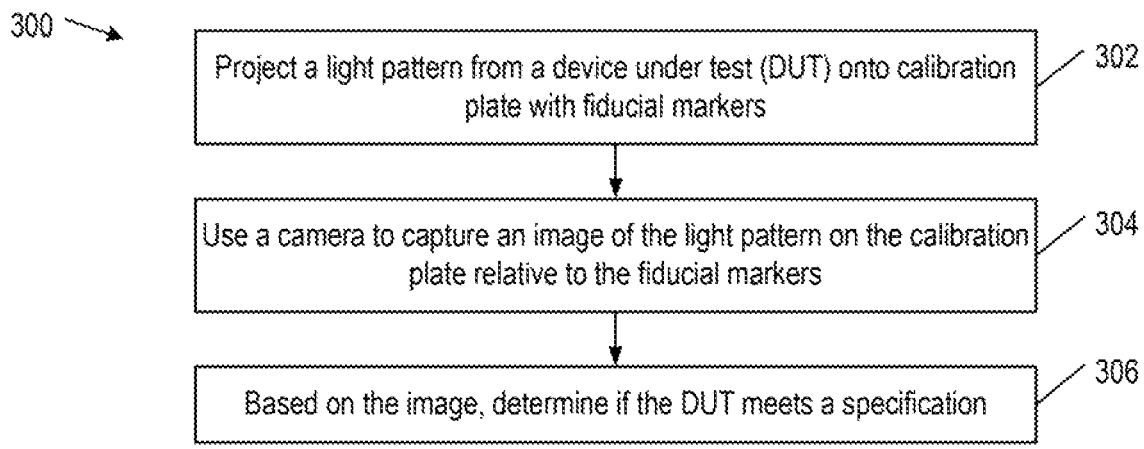
FIG. 3 is a flowchart of a method for the optical alignment measurement system of FIG. 1 to determine if a device under test (DUT) meets a specification in examples of the present disclosure.

FIG. 3 is a flowchart of a method 300 for the optical alignment measurement system 100 of FIG. 1 to determine if a DUT seated on DUT interface 120 of FIG. 1 meets a specification in examples of the present disclosure. Method 300 may begin in block 302.

In block 302, a light pattern from the DUT is projected onto calibration plate 102 of FIG. 1 with fiducial markers 110 of FIG. 1. Block 302 may be followed by block 304.

In block 304, camera 140 is used to capture an image of the light pattern on calibration plate 102 relative to fiducial markers 110. Block 304 may be followed by block 306.

In block 306, it is determined if the DUT meets a specification based on the image.

Figure 4:
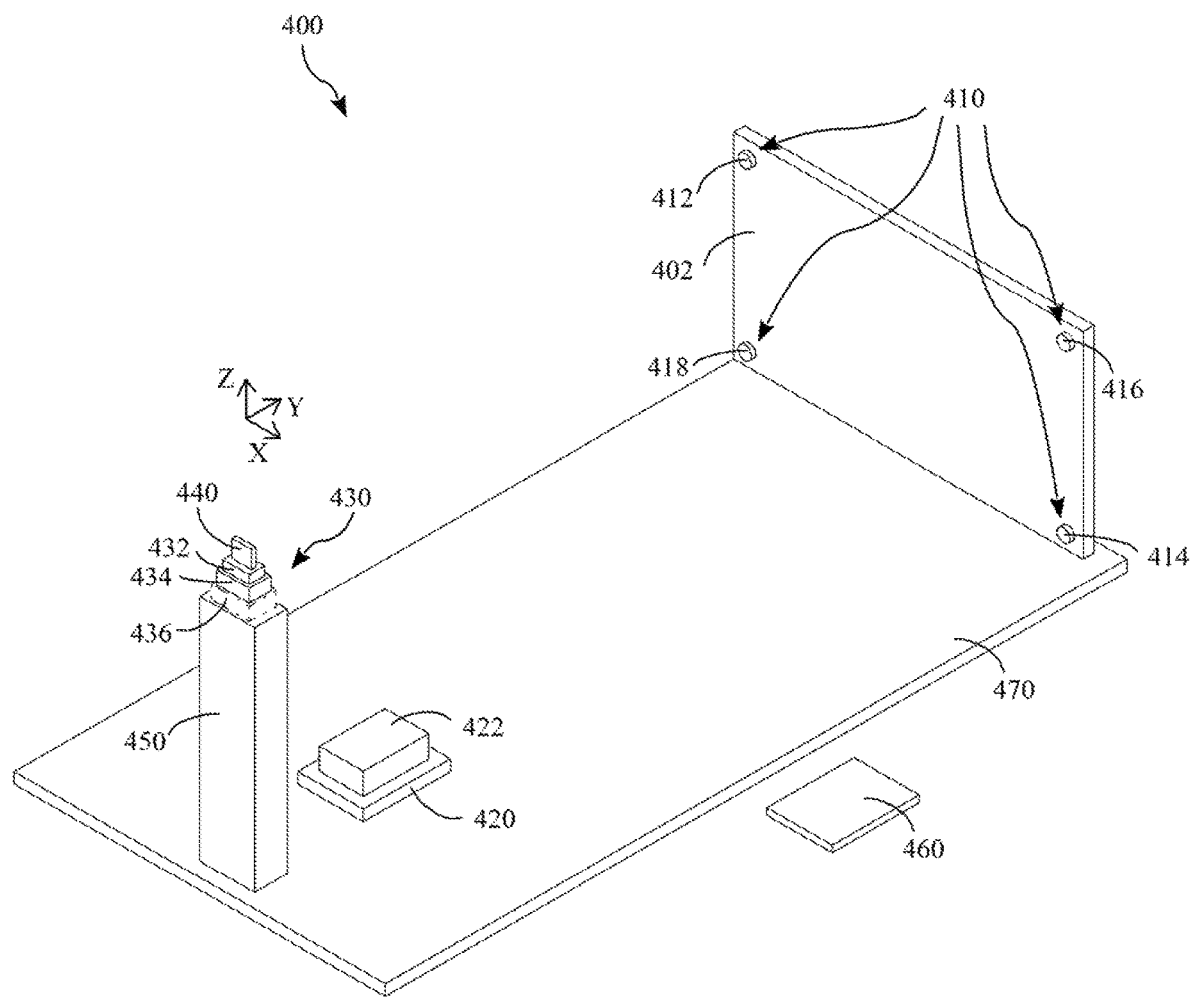
FIG. 4 is a schematic perspective view of an optical alignment measurement system in examples of the present disclosure.

FIG. 4 is a schematic perspective view of an optical alignment measurement system 400 in examples of the present disclosure. Optical alignment measurement system 400 may include a calibration plate 402 with fiducial markers 410, a DUT interface 420, an alignment stage 430, a camera 440 on alignment stage 430, a post 450, and a controller 460. Alignment stage 430 may include a rotary sub-stage 432 for rotating about the Z direction, a linear sub-stage 434 for translating along the X direction, and an optional rotary sub-stage 436 for rotating about the Y direction. Alignment stage 430 may be mounted atop of post 450. Calibration plate 402, DUT interface 420, and post 450 may be fixed relative to each other. For example, calibration plate 402, DUT interface 420, and post 450 may be fixed to a common base 470. A DUT 422 may be mounted atop DUT interface 420.

Fiducial markers 410 may include a first fiducial marker 412, a second fiducial marker 414, a third fiducial marker 416, and a fourth fiducial marker 418. Camera 440 may be mounted on rotary sub-stage 432, rotary sub-stage 432 may be mounted on linear sub-stage stage 434, and linear sub-stage 434 may be mounted on rotary sub-stage 436. The order of rotary sub-stage 432, linear sub-stage 434, and rotary sub-stage 436 may be switched. Rotary sub-stage 432 may be rotatable about a vertical Z direction, linear sub stage 434 may be translatable along, a horizontal X direction, and rotary sub stage 436 may be rotatable about a horizontal Y direction.

Controller 460 may he coupled to camera 440 and alignment stage 430. Controller 460 is to capture an image of calibration plate 402 with camera 440 and determine adjustments to alignment stage 430 based on locations of the fiducial markers 410 in the image.

In some examples of the present disclosure, fiducial markers 410 are circles located at corners of an imaginary quadrilateral, such as a square or a rectangle. In other examples of the present disclosure, fiducial markers 410 are squares or crosses located at corners of an imaginary rectangle.

In examples of the present disclosure, DUT 422 may be a projector. The projector may have adjustable focus and lens shift (e.g., where the projected image may be shifted up, down, left, or right).

Figure 5:
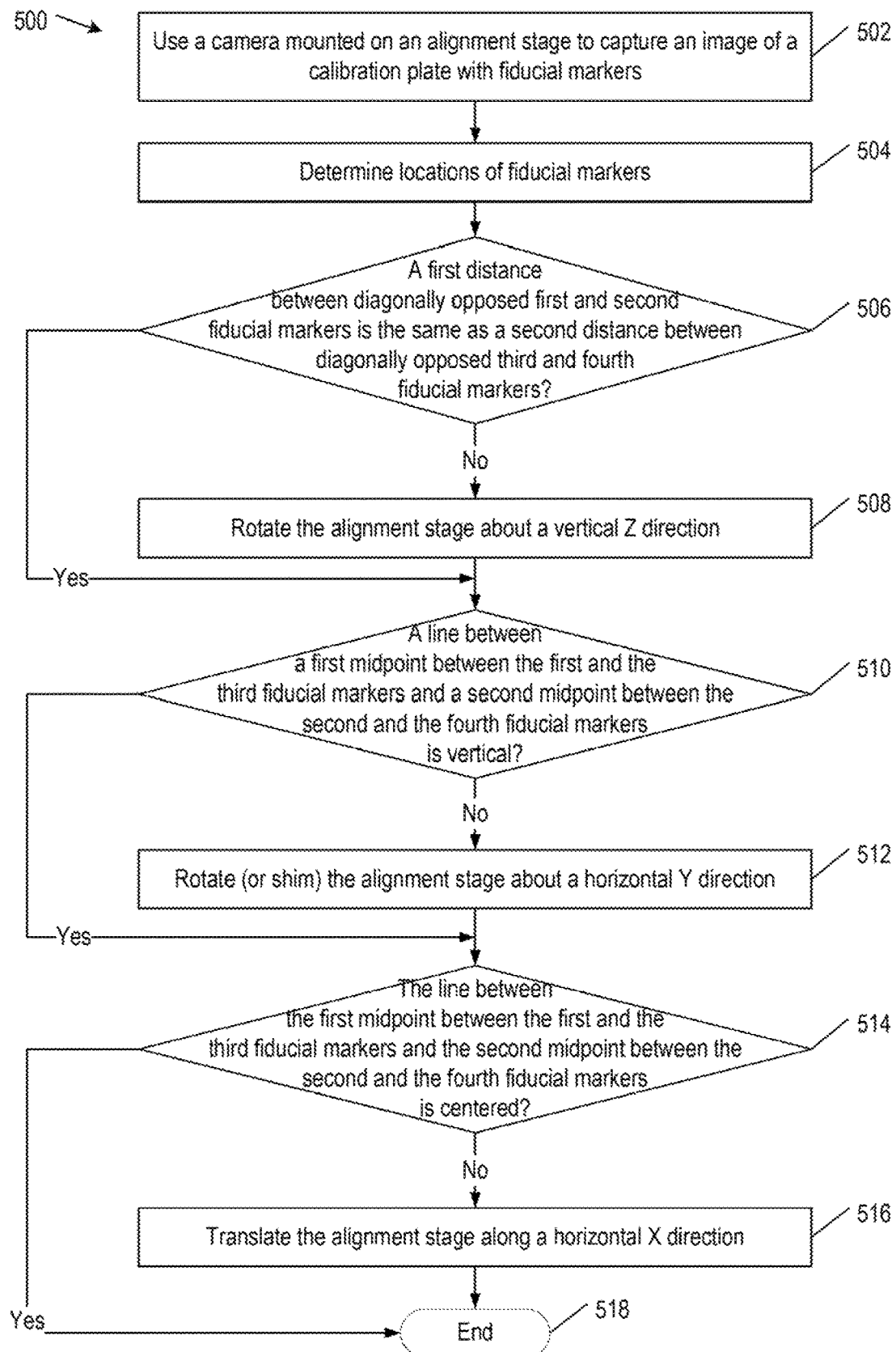
FIG. 5 is a flowchart of a method for a controller in the optical alignment measurement system of FIG. 4 to measure and correct optical misalignment in examples of the present disclosure.

FIG. 5 is a flowchart of a method 500 for controller 460 of FIG. 4 in the optical alignment measurement system 400 of FIG. 4 to measure and correct optical misalignment in examples of the present disclosure. Method 500 may be a variation of method 200 of FIG. 2. Method 500 may begin in block 502.

In block 502, controller 460 uses camera 440 of FIG. 4 to capture an image of calibration plate 402 of FIG. 4 with fiducial markers 410 of FIG. 4. Block 502 may be followed by block 504. Block 502 corresponds to the previously described block 202 of FIG. 2.

In block 504, controller 460 determines the locations of fiducial markers 412, 414, 416, and 418 of FIG. 4 in the image. Block 504 may be followed by block 506.

In block 506, controller 460 determines if a first distance between diagonally opposed first fiducial marker 412 and second fiducial marker 414 in the image is the same as a second distance between diagonally opposed third fiducial marker 416 and fourth fiducial marker 418 in the image. If so, block 506 may be followed by block 510. Otherwise, block 506 may be followed by block 508.

In some examples of the present disclosure, the first distance is considered to be the same as the second distance when the first distance is greater than 99% of the second distance and is smaller than 101% of the second distance. In other examples of the present disclosure, the first distance is considered to be the same as the second distance when the first distance is greater than 99.9% of the second distance and is smaller than 100.1% of the second distance.

In block 508, when the first and second distances are determined to be unequal in block 506, controller 460 adjusts rotary sub-stage 432 of FIG. 4 to rotate camera 440 about the vertical Z direction until the first distance and the second distance are equal in a new image captured by camera 440. Block 508 may be followed by block 510.

In block 510, controller 460 determines if a line between a first midpoint between first fiducial marker 412 and third fiducial marker 416 in the image (a new image if adjustment was made in block 508) and a second midpoint between second fiducial marker 414 and fourth fiducial marker 418 in the image is vertical. If so, block 510 may be followed by block 514. Otherwise, block 510 may be followed by block 512.

The line under investigation is considered to be vertical when the line is vertical in the image. In some examples of the present disclosure the line under investigation is considered to be vertical in the image when the line is greater than 89 degrees and is smaller than 91 degrees. In other examples of the present disclosure, the line under investigation is considered to be vertical when the line is greater than 89.9 degrees and is smaller than 90.1 degrees.

In block 512, when the line under investigation from block 510 is determined to be non-vertical, controller 460 adjusts rotary sub-stage 436 of FIG. 4 to rotate camera 440 abut the horizontal Y direction until the line under investigation from block 510 becomes vertical in a new image captured by camera 440. In other examples of the present disclosure, alignment stage 430 is mechanically shimmed to rotate camera 440 about the horizontal Y direction until the line from block 510 becomes vertical in a new image captured by camera 440. Block 512 may be followed by block 514.

In block 514, controller 460 determines if the line between a first midpoint between first fiducial marker 412 and third fiducial marker 416 in the image (a new image if adjustment was made in block 508 or 512) and a second midpoint between second fiducial marker 414 and fourth fiducial marker 418 in the image is centered. If so, block 514 may be followed by block 518, which ends method 500. If not, block 514 may be followed by block 516.

The line under investigation is centered when the line is centered in the image. In examples of the present disclosure, the line under investigation is considered to be centered in the image when a first distance from the line to a left edge of the image is greater than 99% of a second distance from the line to a right edge of the image, and the first distance and is smaller than 101% of the second distance. In other examples of the present disclosure, the line under investigation is considered to be centered in the image when the first distance is greater than 99.9% of the second distance and smaller than 100.1% of the second distance.

In block 516, when the line under investigation from block 514 is not centered, controller 460 adjusts linear sub-stage 434 to translate camera 440 along the horizontal X direction until the line under investigation from block 514 is centered in a new image captured by camera 440.

Figure 6:
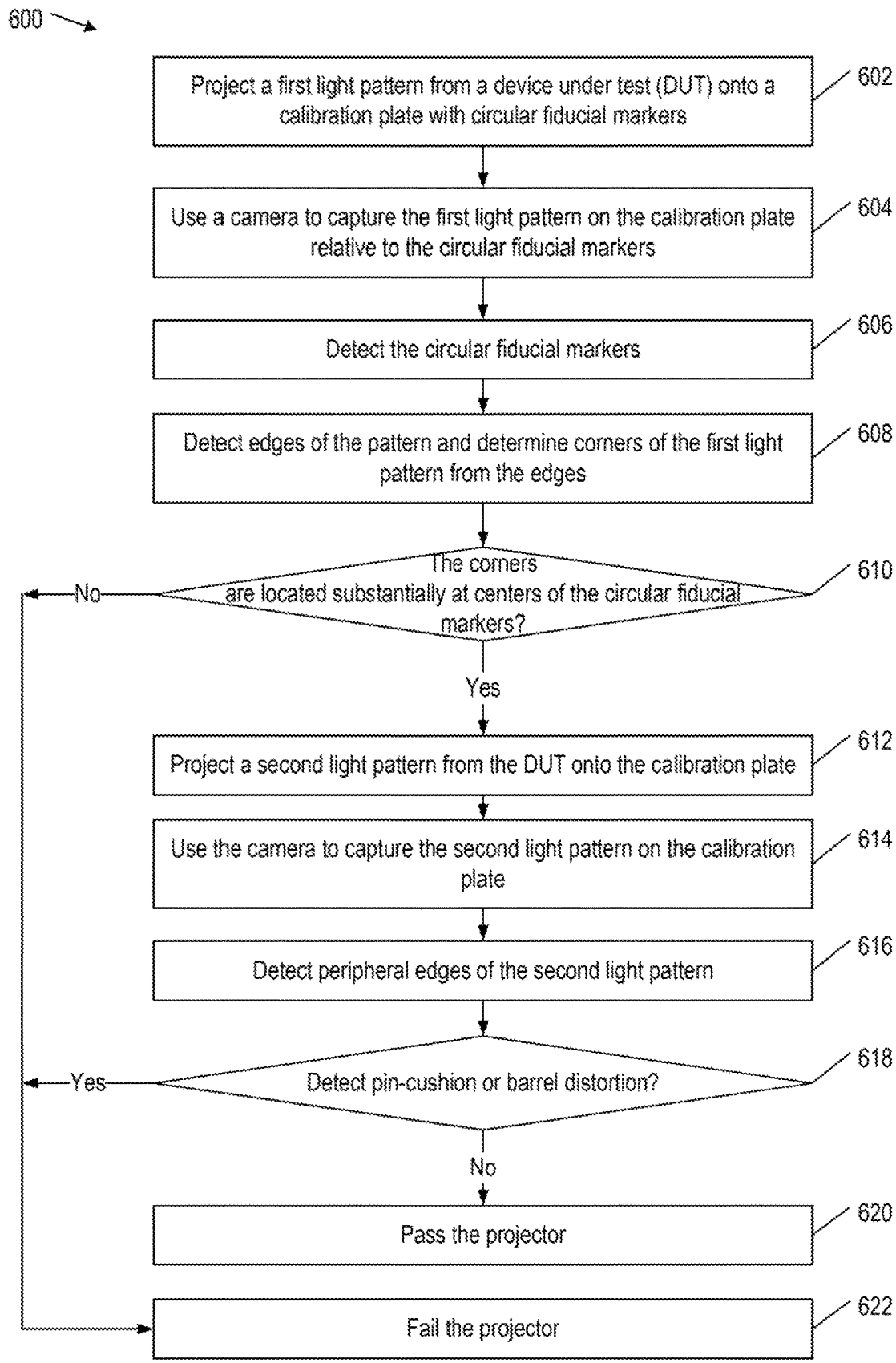
FIG. 6 is a flowchart of a method for a controller in the optical alignment measurement system of FIG. 4 to determine if a DUT meets a specification in examples of the present disclosure.

FIG. 6 is a flowchart of a method 600 for a controller 460 in FIG. 4 in the optical, alignment measurement system 400 of FIG. 4 to determine if DUT 422 of FIG. 4 seated on DUT interface 420 of FIG. 4 meets a specification in examples of the present disclosure. Method 600 may be a variation of method 300. Method 600 may begin in block 602.

In block 602, controller 460 causes DUT 422 of FIG. 4 to project a first light pattern onto a calibration plate 402 of FIG. 4 with fiducial markers 410 of FIG. 4. The light pattern may be a quadrilateral, such as a square or a rectangle, of a solid color. Block 602 may be followed by block 604. Block 602 corresponds to the previously described block 302 of FIG. 3.

In block 604, controller 460 uses camera 440 to capture an image of the first light pattern on calibration plate 402 relative to the fiducial markers 410 of FIG. 4. Block 604 may be followed by block 606. Block 604 corresponds to the previously described block 304 of FIG. 3.

In block 606, controller 460 determines the locations of the circular fiducial markers 412, 414, 416, and 418 of FIG. 4 in the image. Block 606 may be followed by block 608.

In block 608, controller 460 determines the edges of the first light pattern in the image. Controller 460 then determines locations of the corners of the light pattern from the intersections of the edges. Block 608 may be followed by block 610.

In block 610, controller 460 determines if the corners determined in block 608 are located substantially at centers of the circular fiducial markers 412, 414, 416, and 418 of FIG. 4. If so, block 610 may be followed by block 612. Otherwise, block 610 may be followed by block 622.

In block 612, controller 460 causes DUI 422 to project a second light pattern onto calibration plate 402. The light pattern may be a checkerboard. Block 612 may be followed by block 614.

In block 614, controller 460 uses camera 440 to capture an image of the second light pattern on calibration plate 402. Block 614 may be followed by block 616.

In block 616, controller 460 detects peripheral edges of the second light pattern in image. Block 616 may be followed by block 618.

In block 618, controller 460 determines if DUT 422 produces a pincushion or barrel distortion from the peripheral edges. If so, block 618 may be followed by block 622. Otherwise block 618 may be followed by block 620.

In block 620, DUT 422 passes the test because the corners determined in block 608 are located substantially at centers of the circular fiducial markers 412, 414, 416, and 418 and DUT 422 has lens distortion.

In block 622, OUT 422 fails the test because the corners determined in block 608 are not located substantially at centers of the circular fiducial markers 412, 414, 416, and 418 or DUT 422 has lens distortion.

Figure 7:
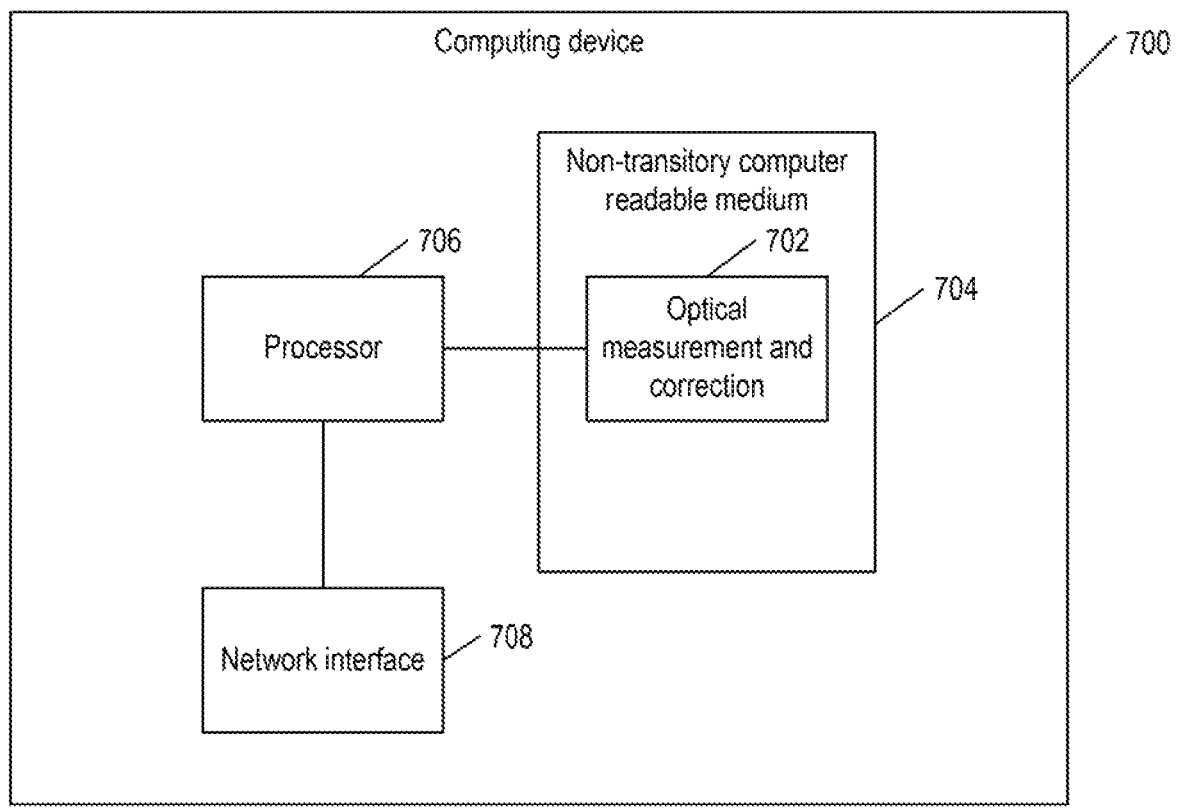
FIG. 7 is a block diagram of a device for implementing the controller of FIG. 4 in examples of the present disclosure.

FIG. 7 is a block diagram of a device 700 for implementing controller 460 of FIG. 4 in examples of the present disclosure. Instructions 702 for an optical alignment measurement system of FIG. 4 that measure and correct optical misalignment and determine if a DUT meets a specification are stored in a non-transitory computer readable medium 704, such as a read-only memory. A processor 706 executes instructions 702 to provide the described features and functionalities. Processor 706 communicates with camera 440 of FIG. 4 and the alignment stage 430 of FIG. 4 via a network interface 708.

In examples of the present disclosure, processor 706 executes instructions 702 on non-transitory computer readable medium 704 to use camera 440 of FIG. 4 mounted on alignment stage 430 of FIG. 4 to capture a first image of calibration plate 402 of FIG. 4 with fiducial markers 410 of FIG. 4, adjust alignment stage 430 by rotating or translating alignment stage 430 based on the first image, project onto calibration plate 402 of FIG. 4 a light pattern from a DUT 422 of FIG. 4, use camera 440 to capture a second image of the light pattern on calibration plate 402 relative to the fiducial markers 410, and determine if DUT 422 meets a specification based on the second image.

In examples of the present disclosure, processor 706 executes instructions 702 on non-transitory computer readable medium 704 to determine if a first distance between diagonally opposed first fiducial marker 412 and second fiducial marker 414 of FIG. 4 in the first image is the same as a second distance between diagonally opposed third fiducial marker 416 and fourth fiducial marker 418 of FIG. 4 in the first image, and adjust alignment stage 430 of FIG. 4 by rotating alignment stage 430 about a vertical Z direction when the first distance is not equal to the second distance.

In examples of the present disclosure, processor 706 executes instructions 702 on the non-transitory computer readable medium 704 to determine if a line between a first midpoint between first fiducial marker 412 and third fiducial marker 416 of FIG. 4 captured in the first image and a second midpoint between second fiducial marker 414 and fourth fiducial marker 418 of FIG. 4 captured in the first image is vertical, and adjust alignment stage 430 of FIG. 4 by rotating alignment stage 430 about a horizontal Y direction when the line is not vertical.

In examples of the present disclosure, processor 706 executes instructions 702 on the non-transitory computer readable medium 704 to determine if the line is centered and adjust the alignment stage 430 of FIG. 4 by translating alignment stage 430 along a horizontal X direction when the line is not centered.

In examples of the present disclosure, processor 706 executes instructions 702 on the non-transitory computer readable medium to determine if DUT 422 of FIG. 4 meets a specification by determining if corners of a quadrilateral light pattern, which is projected on calibration plate 402 of FIG. 4 by DUT 422, are located substantially at centers of fiducial markers 412, 414, 416, and 418 of FIG. 4 that are circles.

In examples of the present disclosure, processor 706 executes instructions 702 on the non-transitory computer readable medium to determine if DUT 422 of FIG. 4 meets a specification by determining if peripheral edges of a checkerboard pattern, which is projected on calibration plate 402 of FIG. 4 by DUT 422, indicates lens distortion.

Various other adaptations and combinations of features of the examples disclosed are within the scope of the disclosure.

What is claimed is:

1. A system comprising:
a device under test (DUT) interface to receive a DUT;
a calibration plate with fiducial markers;
an alignment stage comprising:
a rotary sub-stage,
a linear sub-stage, and
a camera on the alignment stage to capture a first image of the calibration plate, and to capture a second image of the calibration plate with a light pattern from the DUT; and
a controller to:
determine, based on representations of the fiducial markers in the first image, an adjustment of the alignment stage,
adjust, based on the determined adjustment, at least one of the rotary sub-stage to rotate the camera or the linear sub-stage to translate the camera, and
determine if the DUT meets a specification based on the second image.

2. The system of claim 1, wherein:
the camera is mounted on the rotary sub-stage, and the rotary sub-stage is mounted on the linear sub-stage, or
the camera is mounted on the linear sub-stage, and the linear sub-stage is mounted on the rotary sub-stage.

3. The system of claim 1, wherein the rotary sub-stage is rotatable about a vertical direction, and the linear sub-stage is translatable along a horizontal direction.

4. The system of claim 3, wherein the alignment stage further comprises another rotary sub-stage rotatable about another horizontal direction orthogonal to the vertical direction and the horizontal direction.

5. The system of claim 1, further comprising a post, wherein the alignment stage is mounted atop the post.

6. The system of claim 1, wherein the fiducial markers are circles located at corners of an imaginary rectangle on the calibration plate.

7. The system of claim 1, wherein the controller is to:
determine whether a first distance between a first pair of diagonally opposed fiducial marks in the first image is the same as a second distance between a second pair of diagonally opposed fiducial marks in the first image, determine a rotational adjustment of the rotary sub-stage in response to determining that the first distance is not the same as the second distance, and adjust the rotary sub-stage based on the determined rotational adjustment.

8. The system of claim 1, wherein the controller is to:

determine whether a line between a first midpoint of a first pair of fiducial markers in the first image and a second midpoint of a second pair of fiducial markers in the first image is vertical, determine a rotational adjustment of the rotary sub-stage in response to determining that the line is not vertical, and adjust the rotary sub-stage based on the determined rotational adjustment.

9. The system of claim 1, wherein the controller is to:

determine whether a line between a first midpoint of a first pair of fiducial markers in the first image and a second midpoint of a second pair of fiducial markers in the first image is centered in the first image, determine a linear translation adjustment of the linear sub-stage in response to determining that the line is not centered in the first image, and adjust the linear sub-stage based on the determined linear translation adjustment.

10. A method comprising:

receiving, by a controller from a camera mounted on an alignment stage, a first image of a calibration plate with fiducial markers;

determining, by the controller based on locations of the fiducial markers in the first image, an adjustment of the alignment stage;

adjusting, based on the determined adjustment, the alignment stage by rotating a rotary sub-stage of the alignment stage or translating a linear sub-stage of the alignment stage;

projecting onto the calibration plate a light pattern from a device under test (DUT);

using the camera to capture a second image of the light pattern on the calibration plate relative to the fiducial markers; and determining if the DUT meets a specification based on the second image.

11. The method of claim 10, wherein the fiducial markers are located at corners of an imaginary rectangle on the calibration plate, and the method further comprises:

determining, by the controller, if a first distance between diagonally opposed first and second fiducial markers in the first image is the same as a second distance between diagonally opposed third and fourth fiducial markers in the first image;

determining, by the controller, a rotational adjustment of the rotary sub-stage in response to determining that the first distance is not the same as the second distance; and adjusting, by the controller, the rotary sub-stage based on the determined rotational adjustment.

12. The method of claim 10, wherein determining if the DUT meets the specification based on the second image comprises:

passing the DUT when the light pattern aligns to the fiducial markers in the second image; and failing the DUT when the light pattern does not align to the fiducial markers in the second image.

13. The method of claim 12, wherein:

the fiducial markers are circles located at corners of an imaginary rectangle;

the light pattern comprises a quadrilateral; and the light pattern is aligned to the fiducial markers in the second image when corners of the quadrilateral are located substantially at centers of the circles.

14. The method of claim 10, further comprising:

projecting another light pattern from the DUT onto the calibration plate;

using the camera to capture a third image of the other light pattern on the calibration plate;

detecting peripheral edges of the other light pattern in the third image;

detecting if a pincushion distortion or a barrel distortion exists from the peripheral edges; and determining if the DUT meets the specification based on the third image, comprising:

passing the DUT if the pincushion distortion or the barrel distortion is not detected; and failing the DUT if the pincushion distortion or the barrel distortion is detected.

15. The method of claim 10, further comprising:

determining, by the controller, whether a line between a first midpoint of a first pair of fiducial markers in the first image and a second midpoint of a second pair of fiducial markers in the first image is vertical;

determining, by the controller, a rotational adjustment of the rotary sub-stage in response to determining that the line is not vertical; and adjusting, by the controller, the rotary sub-stage based on the determined rotational adjustment.

16. The method of claim 10, further comprising:

determining, by the controller, whether a line between a first midpoint of a first pair of fiducial markers in the first image and a second midpoint of a second pair of fiducial markers in the first image is centered in the first image, determining, by the controller, a linear translation adjustment of the linear sub-stage in response to determining that the line is not centered in the first image, and adjusting, by the controller, the linear sub-stage based on the determined linear translation adjustment.

17. A non-transitory computer readable medium encoded with instructions that upon execution cause a controller to:

use a camera mounted on an alignment stage to capture a first image of a calibration plate with fiducial markers;

determine, based on locations of the fiducial markers in the first image, an adjustment of the alignment stage;

adjust, based on the determined adjustment, the alignment stage by rotating a rotary sub-stage of the alignment stage or translating a linear sub-stage of the alignment stage;

use the camera to capture a second image of a light pattern projected by a device under test (DUT) on the calibration plate relative to the fiducial markers; and determine if the DUT meets a specification based on the second image.

18. The non-transitory computer readable medium of claim 17, wherein the instructions upon execution cause the controller to:

determine if a first distance between diagonally opposed first and second fiducial markers in the first image is the same as a second distance between diagonally opposed third and fourth fiducial markers in the first image, wherein adjusting the alignment stage comprises rotating the rotary sub-stage when the first distance is not equal to the second distance; and determine if a line between a first midpoint between the first and the third fiducial markers in the first image and a second midpoint between the second and the fourth fiducial markers in the first image is vertical or is centered, wherein adjusting the alignment stage comprises rotating the rotary sub-stage when the line is not vertical or translating the linear sub-stage when the line is not centered.

\* \* \* \* \*